Jan. 30, 1951
G. E. BUSKE
2,539,724
AUTOMATIC TEMPERATURE CONTROL DEVICE
Filed Sept. 16, 1946
2 Sheets-Sheet 1
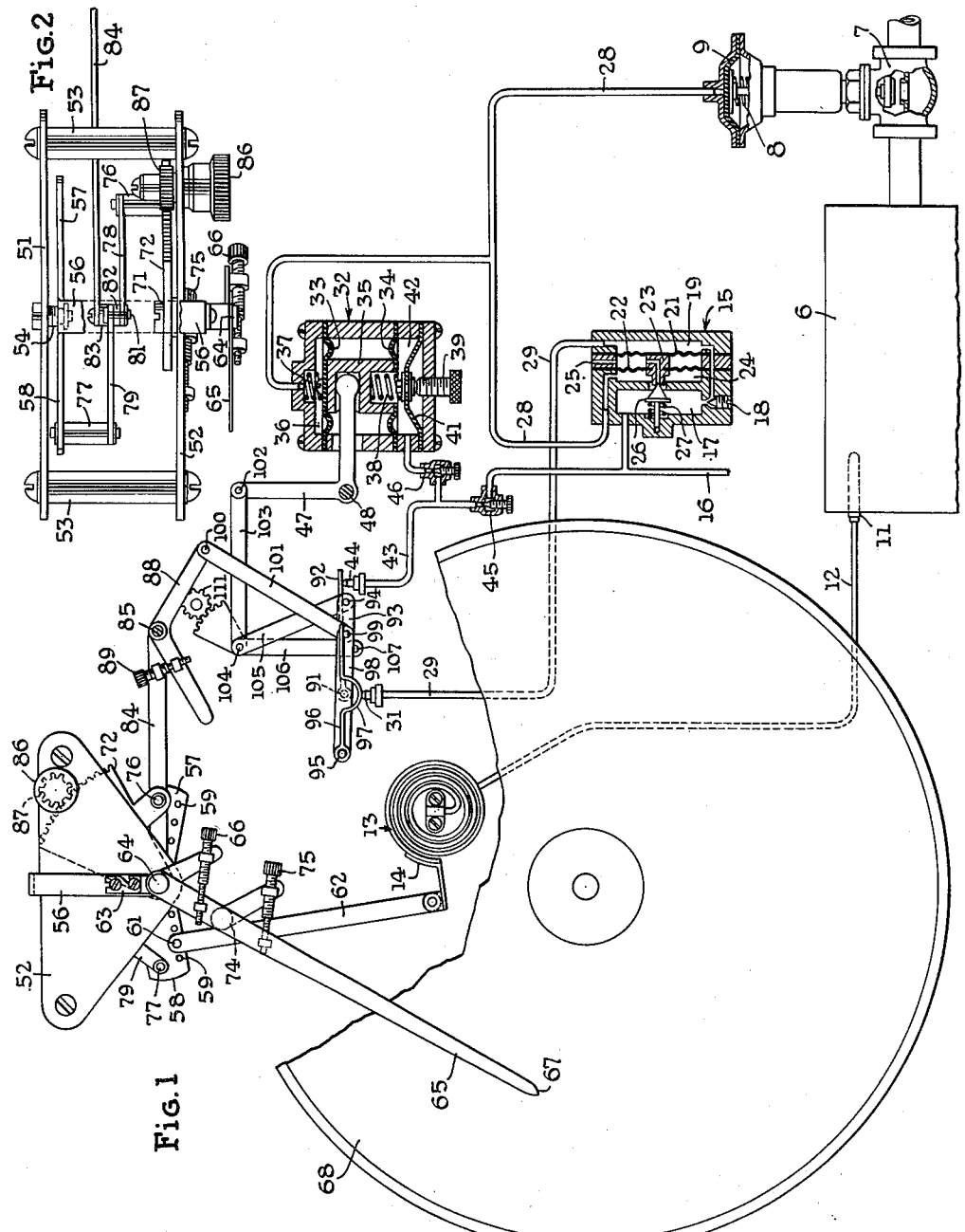
Inventor
Gilbert E. Buske
By
Dodge and Ims
Attorneys Patented Jan. 30, 1951

2,539,724

UNITED STATES PATENT OFFICE 2,539,724

AUTOMATIC TEMPERATURE CONTROL DEVICE

Gilbert E. Buske, Anson, Wis., assignor to Johnson Service Company, Milwaukee, Wis., a corporation of Wisconsin Application September 16, 1946, Serial No. 697,371

6 Claims. (Cl. 236—82)

This invention relates to automatic control devices and will be described, simply by way of example, as embodied in a recording controller which controls heat-input in response to temperature and load, the control being such that temperature is maintained substantially constant.

The primary response is to changes of temperature. The device includes, however, a reset mechanism which in effect responds to load changes and reestablishes the control point of the temperature-responsive element.

The mechanism also includes a device for adjusting sensitivity. Sensitivity in a pneumatic temperature responsive instrument, such as that here disclosed, is the change in branch line pressure (i. e., the factor which controls heat input) per unit of movement of the temperature responsive element. If the pressure change is large per unit of movement, sensitivity is said to be high.

The device which adjusts sensitivity and the reset mechanism are so inter-related that in the high sensitivity settings the reset mechanism is ineffective or only slightly effective. As sensitivity is lowered the effectiveness of the reset mechanism progressively increases. In the preferred arrangement the reset device is wholly inactive when sensitivity is maximum, fully active when sensitivity is minimum, and is graduated in activity between these limits.

The invention is not limited to temperature responsive devices, but its principles can be applied to automatic controls for maintaining humidity, pressure and other variables.

A preferred embodiment of the invention in a recording controller of the type above described will now be discussed in detail by reference to the accompanying drawings, in which—

Fig. 1 is a diagrammatic elevation of the complete system;

Fig. 2 is a plan view of a portion of the mechanism shown in Fig. 1;

Figure 3:
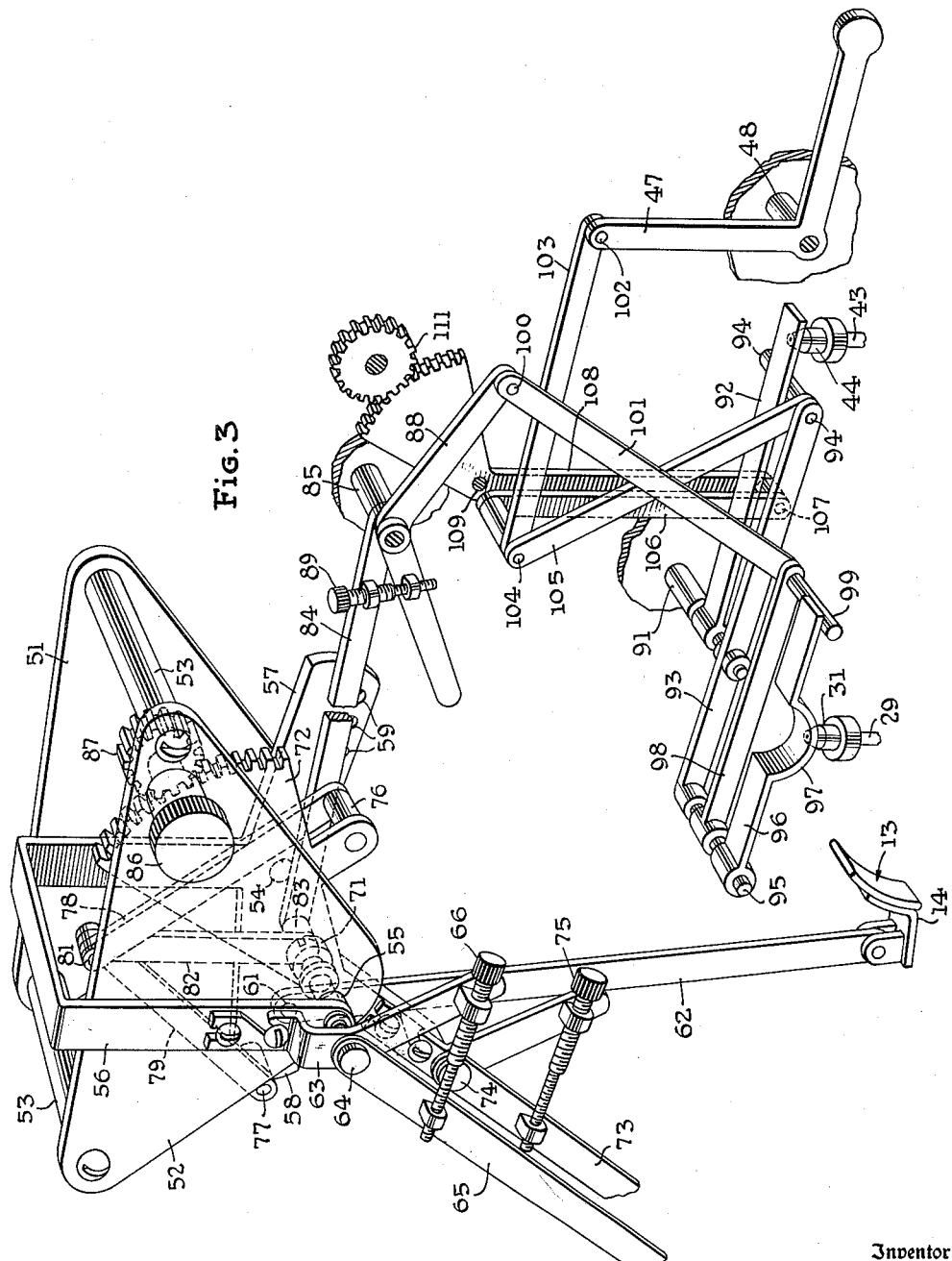

Fig. 3 is a perspective view of the linkage which controls the primary leak port and the linkage which exercises a modifying control on the reset leak port. The latter includes manual means for adjusting sensitivity and also for varying the effectiveness of the reset mechanism. The former includes manual means for adjusting the control point.

To avoid complicating the drawing and thus obscuring the essential elements of the device, conventional supporting and enclosing parts, and mechanism for driving the record disc are omitted.

Refer first to Fig. 1. The container 6 represents any space to which heating medium is supplied by a valve 7. The valve is biased in an opening direction by a spring 8 and may be moved in a closing direction by air under pressure reacting against the upper side of diaphragm 9. It is assumed that the loss of heat from container 6 varies, and the object of the invention, as here applied, is to maintain a constant temperature in container 6 by adjusting valve 7.

A bulb 11 containing an expansible fluid such as mercury is mounted in container 6 and is connected by a capillary tube 12 with a Bourdon tube 13 whose inner end is fixed and whose outer end 14 moves clockwise upon rise of temperature at bulb 11. The mechanism to be described controls valve 7 in response to the motion of Bourdon tube 13 and the pressure on diaphragm 9 in such a way that the temperature in container 6 remains constant (or virtually constant) despite variations in the demand for heating medium, such variations being incident to variations in loss of heat from the container, however caused.

As stated, the foregoing defines one typical environment in which the invention may be used.

The pressure acting on diaphram 9 is controlled directly by a relay generally indicated at 15 and of the type shown in the patent to Otto, 1,500,260, July 8, 1924. In such a relay a supply line 16 delivers air at say 20 pounds gage pressure to supply chamber 17 and thence past throttling valve 18 to space 19 at the forward side of diaphragm 21. This diaphragm and a similar diaphragm 22 carry at their centers the exhaust fitting 23 having an exhaust port which leads from space 24 at the rear of the second diaphragm to the space between the diaphragms which space is freely vented to atmosphere at 25. When pressure develops in space 19 the diaphragms move to the left, valve 26 which is loaded by spring 27 first closes the exhaust port and then is unseated so as to admit air to, and develop pressure in, space 24.

Space 24 is connected by branch line 28 with the space above diaphragm 9. Space 19 is connected by line 29 with leak port 31 which has a flow capacity greater than that of throttling valve 18 as adjusted. Thus, variable throttling of port 31 establishes pressures in 19 between atmosphere and the supply pressure, here assumed to be 20 pounds gage. Since the diaphragms 21 and 22 are equal in size the relay establishes in space 24 and branch line 28 whatever pressure is developed in space 19.

The branch line 28 is also connected to a reset unit, generally indicated at 32. This includes a housing whose form is sufficiently indicated in the drawing with two diaphragms 33 and 34 connected at their centers by spacer 35. Branch line 28 communicates with space 36 above diaphragm 33 and the branch line pressure is assisted by a coil compression loading spring 37. A counteracting spring 38 acts on spacer 35 in opposition to spring 37 and its stress is adjusted by turning thrust screw 39 which acts as a spring seat. A slack diaphragm 41 is used to inhibit leakage along screw 39 from the space 42 beneath diaphragm 34.

Pressure in line 43 is controlled by a leak port 44 which is variably throttled by means later to be described. Line 16 feeds line 43 through constriction 45 whose flow capacity is less than that of leak port 44. Line 43 is in communication with space 42 through an adjustable constriction 46 so that pressure in space 42 follows that in line 43 but with a substantial time lag.

A recess in spacer 35 confines the rounded head on one arm of a bell-crank 47 which turns on a fixed journal 48, and is the moving member which resets the thermostat.

The mechanism which relates the Bourdon tube 13 and the reset lever 47 to the leak ports 31 and 44 will now be described. Reference should now be made particularly to Figs. 2 and 3.

Mounted on a suitable fixed support is a frame made up of a rear plate 51 and a front plate 52, rigidly connected together in spaced relation by bolts and spacer tubes 53, clearly illustrated in the drawing. A pivot screw 54 mounted in the rear plate and a bearing 55 coaxial therewith, and carried by the front plate 52, support a stirrup like member 56. This serves as a pivoted carrier for the pen arm.

The rear arm of the member 56 has opposed lateral extensions 57 and 58, in each of which is a row of holes 59. Any one of these will receive the pivot 61 at the upper end of link 62. The lower end of link 62 is hinged to the arm 14. The provision of these series of the holes 59 on opposite sides of the bearing 54 permits the Bourdon tube 13 to be connected with the member 56 in either of two reverse relations, and with various motion ratios for each relation. With the parts connected as shown in the drawing rising temperature causes the member 56 to turn clockwise.

A bracket 63 is clamped to the member 56 by screws, as clearly shown in the drawing, and to this the pen arm 65 is hinged at 64. A turnbuckle 66 of the differential type is provided to afford a zeroing adjustment of the pen arm. When the instrument is in operation the arm 65 is fixed relatively to the member 56. At the extremity of the arm 65 is the pen 67 which marks in the usual manner on a rotary disc chart 68. The chart 68 is driven by any suitable clock mechanism not shown.

At the rear side of front plate 52 is a bearing 71, whose axis is coincident with the axis of bearings 54 and 55. A gear sector 72 is mounted in this bearing and carries an indicator or pointer 73. This arm is hinged to the sector 72 at 74 and a differential turnbuckle 75 affords means for zeroing adjustment. The pointer 73 indicates on the chart 68 the temperature at which the instrument is set to control. Obviously the pen arm and the indicator arm swing about the same geometrical axis.

The sector 72 carries a journal pin 76. The arm 58 carries a similar journal pin 77. The radial distance of journal pin 77 from the pivot 54 is the same as the radial distance of journal pin 76 from the axis of bearing 71. A pair of floating links 78, 79, equal in length, are connected by hinge pin 81 and are respectively supported by the journal pins 76 and 77. An upright drag link 82 is also connected to the hinge pin 81 and carries at its lower end a hinge pin 83 which connects the drag link 82 and the regulatory lever 84. The lever 84 is mounted on a journal pin 85, which is fixedly supported on a portion of the instrument base. The lengths of the link 82 and lever 84 are such, that when the sector 72 is so set that the pointer 73 gives the same reading as the pen arm 65, the axis of the pin 83 coincides with the geometrical axis common to the pivot 54, bearing 71 and bearing 55.

Thus, the mechanism includes a manually set pointer, a pen arm operated by a responsive element (in this case a thermostat) and a differential linkage which responds to relative motion of the pen arm and pointer.

If the arms 65 and 73 move as one the journals 76 and 77 revolve about a common axis and the pin 83 remains on that axis so that lever 84 is not affected. Obviously, therefore, the control point of the instrument may be adjusted at any time, simply by adjusting the sector 72. This adjustment is made by knob 86 which turns a pinion 87 in mesh with the toothed periphery of the sector 72.

The lever 84 has an extension 88 which is hinged to it, and which is capable of a zeroing adjustment by means of a differential turnbuckle 89.

Mounted on a fixed support is a journal pin 91. On this is freely journaled a lid 92 positioned to control the leak port 44. Also journaled on the pin 91 is a rock lever 93. At its righthand end, lever 93 carries a pin 94, which underlies the lid 92, so that when the lever 93 is turned counterclockwise it lifts the lid 92. At the lefthand end of lever 93 is a journal pin 95 on which are mounted a lid 96 and an arm 98. The lid 96 has an arcuate portion 97 which is coaxial with the journal 91 so as to engage leak nozzle 31 in any position of lever 93. The arm 98 has a pin 99 underlying the end of the lid 96. A drag link 101 is hinged on pin 99 at one end and at the other is pinned at 100 to the end of extension 88.

An inspection of Figs. 1 and 3 will make it clear that if the lever 84 swings clockwise the lid 96 will be lowered toward or against the leak port 31. If the lever 93 is then swung clockwise the effect will be to lift the lefthand end of the lid 96 and thus neutralize in some degree the effect just mentioned.

The lever 93 is controlled by the bell-crank lever 47 already mentioned as actuated by the reset mechanism. The invention provides an adjustable linkage which may be set so that motion of the lever 47 may have no effect whatsoever on the lever 93, or may tilt the lever 93 in any desired ratio progressively from the zero setting just mentioned to the maximum afforded by the linkage.

The upstanding end of bell-crank 47 is connected at 102 with a link 103 and this in turn is hinged at 104 to a second link 105 journaled on the pin 94 at the right hand end of lever 93. The path of the hinge pin 104 is controlled by radius link 106 on whose end the pin 104 is mounted. A change of path is effected by shifting the journal pin 107 on which the radius link 106 turns. The journal pin 107 is mounted on the lower end of an arm 108, equal in length with both the link 106 and link 105 and journaled at 109 on a fixed support.

In the preferred arrangement, the lever 93 is normally horizontal and the parts are so arranged that when the arm 108 and the radius link 106 are vertical, as illustrated, they bisect the interval between the axis of journal 91 and the axis of the pin 94. The position of the arm 108 is adjustable by a gear and sector indicated at 111 and the range of movement is from a position in which the axis of journal pin 107 coincides with the axis of the pin 94, to a position approximating alinement of pin 107 with the axis of the journal 91.

In the former position motion of the lever 47 will have no effect on the motion of the lever 93, because in such position the links 105 and 106 will simply swing idly about a common axis as the bell-crank 47 moves. Conversely, when the pivot 107 is adjacent the journal 91 the bell-crank 47, and consequently the reset mechanism, will have the maximum effect on the motion of lever 93.

As will be explained hereafter, the first-named setting is a high-sensitivity setting in which the reset mechanism is substantially ineffective. The second setting is the low-sensitivity setting in which the effect of the reset mechanism is maximum.

When the lever 93 is in its normal position, here assumed to be horizontal, it sustains lid 92 in such relation to leak nozzle 44 that flow through the leak port is restricted but not prevented. This affords an intermediate pressure in line 43 so that this pressure may be varied in both directions by the repositioning of lever 93 and lid 92.

The position of this lid controls a flow of energy (air under pressure) to and from space 42. Consequently the energy which effects reset is available at any desired rate and in any necessary amount. It is not limited to what may be developed by restricted, pressure-equalizing flow from space 36 to space 42 as was the case in the prior art. Hence the reset characteristics are subject to better control.

When the instrument is properly adjusted so that heat input through valve 7 balances heat dissipation from container 6 and the desired temperature exists at bulb 11, the following conditions exist:

1. Pen arm 65 coincides in position with pointer 73.
2. Lever 84 is horizontal so that hinge pin 83 and pivot 54 aline.
3. Screw 89 is so adjusted that hinge pin 104 and journal 109 aline and lid 92 controls lead port 44 to establish the appropriate balancing pressure in space 42.

Changes of the rate of heat dissipation affect temperature at bulb 11, a reduction of the rate of heat dissipation causing temperature to rise and vice versa.

Assume a reduction in the rate of heat dissipation with attendant rise of temperature. Pen arm 65 moves outward (clockwise) relatively to pointer 73, turning lever 84 clockwise and lowering lid 96. This causes pressure in branch line 28 to rise. In consequence, valve 7 moves in a closing direction and bell-crank 47 swings clockwise.

In any setting of arm 108 except the maximum sensitivity setting, motion of bell-crank 47 clockwise tilts member 93 clockwise lifting the hinge end of lid 96 and thus neutralizing in some degree the antecedent lowering of lid 92. While the first effect is neutralization of the initial lowering of lid 96, this is followed, after a short period determined by the setting of valve 46, by a reversed motion of lever 47. This reversed motion again shifts member 93 clockwise which causes a further pressure rise in branch line 28 and a further closing of valve 7. It will be seen that the pressure in branch line 28 continues to rise and valve 7 continues to close until the temperature is such that pen arm 65 coincides with the pointer 73. This, of course, is the desired condition.

As above explained, the device has a primary response to temperature and a secondary response to the position of valve 7 as evidenced by the valve-controlling pressure in branch line 28. These are so coordinated that the device functions to maintain a substantially constant temperature.

Change of the sensitivity setting changes the angular motion of the member 93 in response to changing branch line pressure. When sensitivity is highest the axes at 107 and 94 aline and no motion of member 93 occurs. Under such conditions the reset mechanism has no effect. As sensitivity is lowered by shifting pin 107 toward journal pin 91, the effect of reset increases and becomes maximum at the lowest sensitivity setting. Thus the reset action and sensitivity are nicely coordinated.

When the pen arm 65 departs from coincidence with pointer 73 as a result of temperature change at bulb 11, the resulting change of pressure in branch line 28 has a neutralizing effect on the throttling of leak port 31, halting the pressure change at some new value. The neutralizing action is produced by motion of member 93, and this motion changes the throttling effect of lid 92 on the second leak port 44. In consequence, there is a change of pressure in line 43 (which is not necessarily the same as the change which has occurred in line 28) and this changed pressure becomes effective in space 42 after a time interval determined by the adjustment of valve 46.

Until the pen arm 65 returns to coincidence with pointer 73, the position of valve 7 will continue to change. The rate of this change will depend on the setting of valve 46, and not upon the magnitude of the original temperature change. Consequently, the resetting action is subject to a control which is absolute and not modified by the rate at which temperature changes occur. For this reason the resetting action is better than that attained heretofore.

While the primary response is to changes in temperature, there is a definite and semi-independent control in response to changes of load. Since the invention must be claimed in words, and since a verbal explanation offers a better basis for terms to be used in the claims than does a mathematical analysis, such an explanation will be adopted. Though the description will refer to steps, the action is not step by step, but involves overlapping effects that occur and blend so rapidly that only the final result is discernible.

The bulb 11 can be considered as subject to a minutely wavering temperature which causes the pen arm 65 to waver. Hence lid 96 moves minutely toward and from leak nozzle 31 and pressure in branch line 28 wavers similarly. In any low sensitivity setting of arm 108, the wavering of branch line pressure tends to cancel the motions of lid 96 which produced them, and valve 7 remains unaffected. Thus the device is stable.

If the demand for heat changes, temperature at bulb 11 will change at a sustained rate. Changing pressure in line 28 and space 36 cancels only the first impact of the change of temperature, for during a sustained change lid 92 changes the throttling of leak nozzle 44, and a change of motive pressure in space 42 becomes effective to change pressure in branch line 28 in the direction necessary to neutralize the change of temperature. The invention permits this reaction to be made as intense as is desired.

The lid 92, nozzle 44, and restriction 46 perform, in effect a continuous integration of the product of time and the instantaneous difference between actual temperature and the set temperature (control point). The result is applied as a corrective influence to the valve 7, so that changes of load are corrected by changes of heat input before they can cause serious departure from the set temperature.

The inventive principle can be applied in various ways, the most significant novel features being: performance of reset by energy derived from a source other than the branch line; variation of the effect of reset in relation to sensitivity; elimination of reset in high sensitivity setting, without requiring physical disconnection of the reset mechanism, and control of reset by a distinct leak port device. Various other features of novelty are present.

Thus, while one embodiment of the invention has been described in great detail, modifications of the device illustrated within the scope of the invention are possible and are contemplated within the scope of the claims.

What is claimed is:

1. In an automatic control device, the combination of a source of elastic pressure fluid; a pressure operated device for controlling a variable condition; a responsive element which moves in response to changes in said variable condition; a first pressure controlling valve unit supplied with pressure fluid from said source, connected to be actuated by said responsive element and serving to control the pressure which operates said pressure operated device; proportioning means comprising a pressure motor energized by the pressure so controlled and tending to reduce the effect of said responsive element on said first valve unit; resetting means comprising a pressure motor serving, when active, to oppose said proportioning means and at least partially neutralize the effect thereof; opposed springs arranged to bias said proportioning means and said resetting means to a neutral position; means for adjusting one of said springs; a second valve unit supplied with pressure fluid from said source, controlling pressure in said resetting motor and itself controlled by said proportioning means; and means for delaying response of the resetting motor to the controlling action of said second valve unit.

2. In an automatic control device, the combination of a source of elastic pressure fluid; a pressure operated device for controlling a variable condition; a responsive element which moves in response to changes in said variable condition; a proportioning pressure motor; an opposed resetting pressure motor; yielding means biasing said motors to an intermediate position; a first pressure controlling valve unit connected to be actuated by said responsive element supplied with pressure fluid from said source and serving to control pressure in said proportioning motor and the pressure which actuates said pressure operated device; a second pressure controlling valve unit supplied with pressure fluid from said source, arranged to control pressure in said resetting motor; means for delaying the effect of the second valve unit on pressure in the resetting motor; a variable ratio linkage serving to relate said motors to both valve units, the parts being so related that the proportioning motor serves to reduce the effect of the responsive element on the first valve unit and shift the second valve unit, and the resetting motor when rendered active by shift of the second valve unit acts to suppress the effect of the proportioning motor; and means for adjusting the ratio at which said linkage operates.

3. The combination defined in claim 2, in which the variable ratio linkage is progressively adjustable between limiting positions, in one of which the proportioning and resetting motors move without effect on either valve unit, the effect on both valve units progressively increasing as the linkage is adjusted toward the other limit.

4. The combination defined in claim 2 in which the variable ratio linkage comprises a first link, a second link and a radius link hinged together on a common axis, the other ends of the first and second links being hinged one to a part moved by said motors and the other to a part operatively related to said valve units, the radius link serving to guide said axis and having an effective length equal to that of the second link; and a shiftable fulcrum for the radius link so arranged that the fulcrum may be adjusted through a series of positions in one of which the fulcrum is coaxial with that hinge of the second link which is remote from said common axis.

5. In an automatic control device, the combination of a source of elastic pressure fluid; a pressure operated device for controlling a variable condition; a responsive element which moves in response to changes in said variable condition; a proportioning pressure motor; an opposed resetting pressure motor; yielding means biasing said motors to an intermediate position; a first pressure controlling valve unit supplied with pressure fluid from said source, controlling the pressure in the proportioning motor and the pressure which actuates said pressure operated device, said valve unit comprising a leak port, a shifting support, and a lid hinged on said shifting support, connected at its free end with said responsive element to be moved thereby and arranged to coact with said leak port; a second pressure controlling valve unit supplied with pressure fluid from said source, serving to control pressure in said resetting motor and comprising a leak port, and a hinged lid for controlling said port and arranged to be moved by the shifting of said shifting support; means for delaying the effect of the second valve unit on pressure in the resetting motor;

and a mechanical connection between said motors and said shifting support, so arranged that the proportioning motor serves to neutralize the effect of the responsive element on the first lid and move the second lid, and the resetting motor when rendered active through the response of the second valve unit acts to neutralize the effect of the proportioning motor.

6. The combination defined in claim 5 in which the mechanical connection between the motors and the shifting support affords a variable motion ratio, and means are provided to adjust said ratio.

GILBERT E. BUSKE.

REFERENCES CITED

The following references are of record in the file of this patent:

UNITED STATES PATENTS

| Number | Name | Date |
| --- | --- | --- |
| Re. 20,092 | Mason | Sept. 1, 1936 |
| 2,176,603 | Belaef | Oct. 17, 1939 |
| 2,264,254 | Brandt | Nov. 25, 1941 |
| 2,274,741 | Rolnick | Mar. 3, 1942 |
| 2,332,627 | Erbguth | Oct. 26, 1943 |